Feb. 28, 1939.  H. MOLLY  2,148,955
METHOD OF AND MEANS FOR DRESSING ROTATING DISKS
FOR GRINDING GEARS WITH INCLINED TEETH
Filed Dec. 20, 1934   2 Sheets-Sheet 1
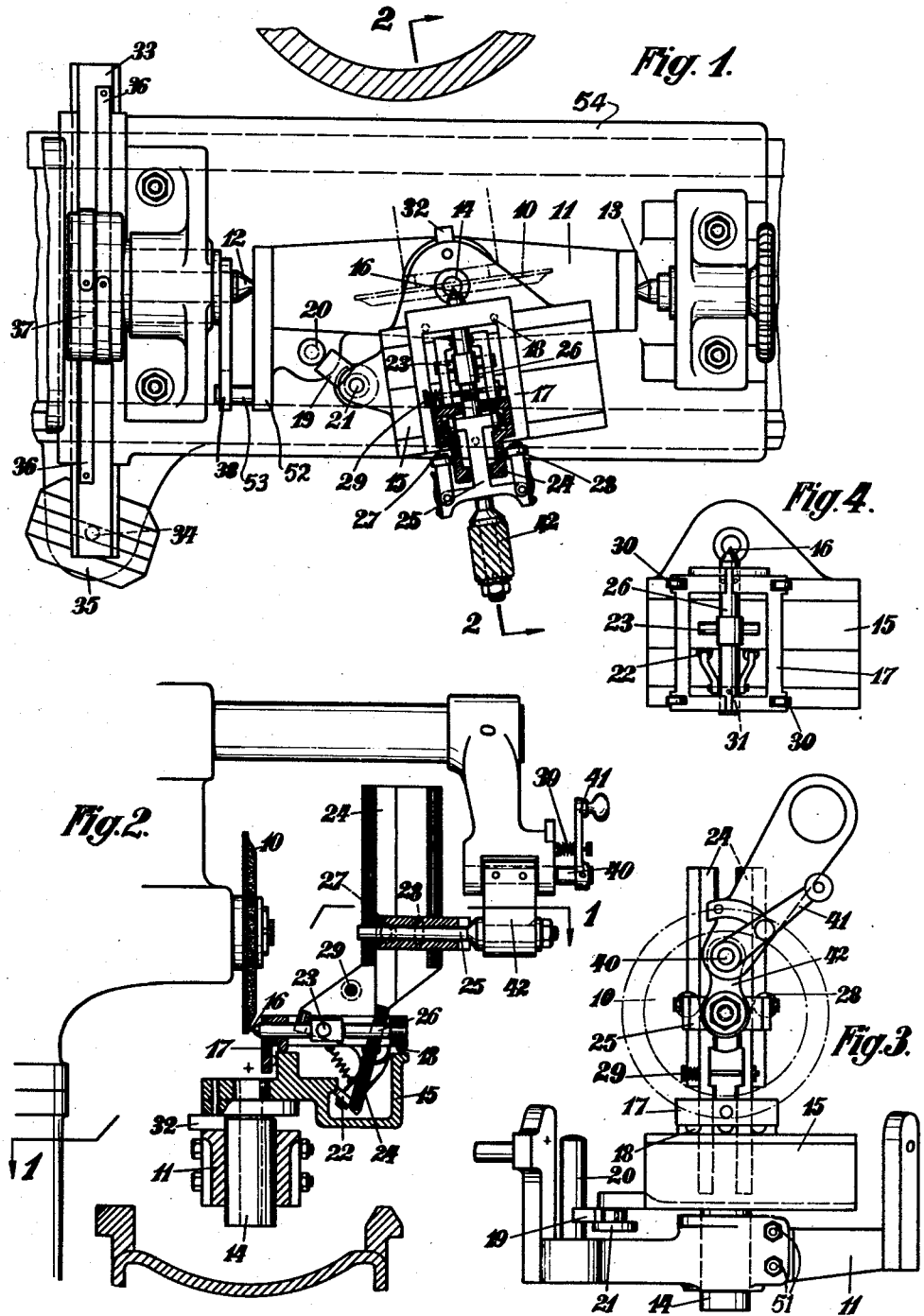

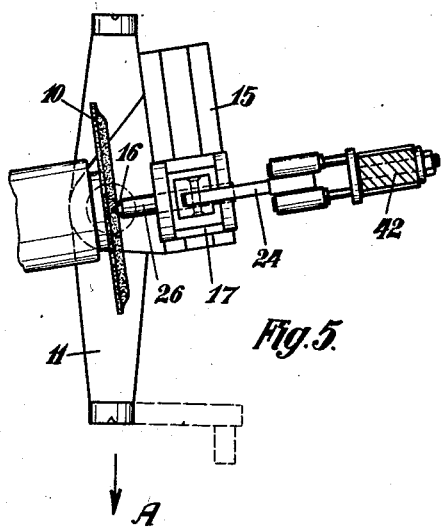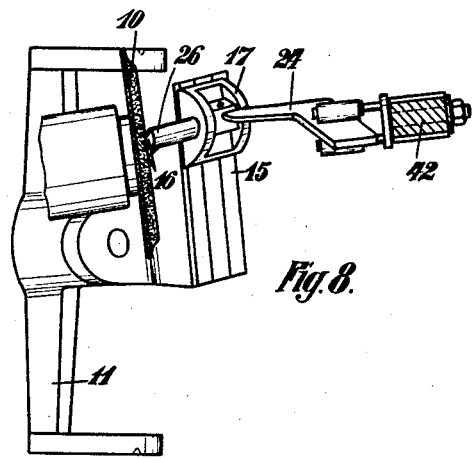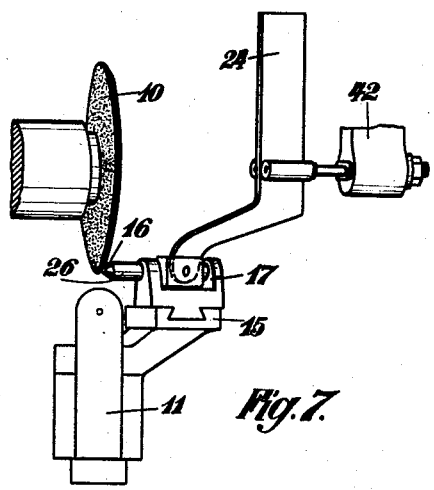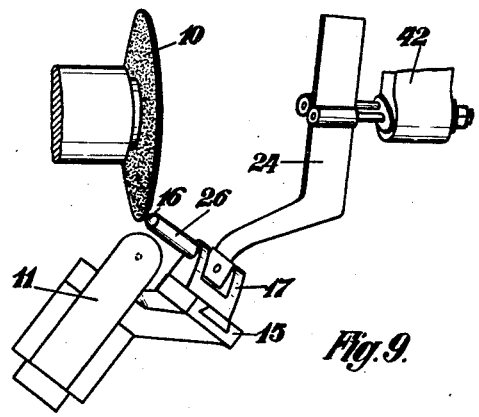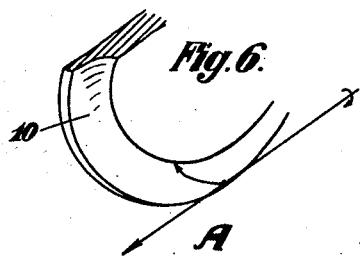

Patented Feb. 28, 1939

2,148,955

UNITED STATES PATENT OFFICE

2,148,955

METHOD OF AND MEANS FOR DRESSING ROTATING DISKS FOR GRINDING GEARS WITH INCLINED TEETH

Hans Molly, Friedrichshafen, Germany, assignor to Zahnradfabrik Friedrichshafen Aktiengesellschaft, Friedrichshafen, Germany Application December 20, 1934, Serial No. 758,412
In Germany December 22, 1933

8 Claims. (Cl. 125—11)

This invention is directed to dressing or truing rotary grinding disks for grinding the teeth of helicoidal gears and wherein the teeth have an involute profile. The particular object of the invention is to so shape the operating surface of grinding disks that the same will under all conditions throughout the length of the gear to be ground work on a line along the involute helicoidal tooth surface corresponding to the line of simultaneous engagement between gears of such type under operating conditions.

The dressing of grinding disks with an involute profile can readily be accomplished by means known in the art where the teeth extend axially of the gear, for in such case the line of contact between the teeth and intermeshing gears lies in a plane passing through the gear axis and extending parallel to such axis. Where, however, the teeth run helically of the gear a different situation exists. Under such circumstances the line of contact between the involute surfaces of the teeth is a straight line beginning at a point adjacent to the root of a tooth and running over the involute side to the point of the tooth at an angle to and out of the plane of the gear axis. On finishing at the point of the tooth the bearing contact is along a new straight line which begins again at the root of the tooth and follows a course similar to the preceding straight line of engagement. It may thus be said that the line of simultaneous engagement, or the bearing line, is made up of a series of successive straight lines as the meshing of the gears progresses axially from one end of the gear to the other. The direction of the line of engagement is determined by the pitch of the teeth, and at the pitch circle radius will always be at an angle to the longitudinal axis of the pitch circle cylinder.

Since, for reasons indicated, the bearing contact between the helicoidal teeth changes its position relative to the root and point of the teeth, the involute profile to be provided on the grinding surface can not be of the same profile as the involute profile of the teeth. The profile of the disk must be such that as successive portions of the tooth are presented to the grinding disk the grinding point should coincide with the line of bearing engagement between teeth of similar gears at progressive lengthwise portions thereof. Accordingly, the dressing or truing tool to be used in preparing the surface of the grinding disk must be so positioned that it at all times coincides with a line representing the straight line of simultaneous engagement along which travels the point of bearing contact between teeth of helicoidal gears as the same are rotated in actual operation. The tool will be operated to produce an involute surface on the grinding disk, but the path traced will not coincide with the exact profile of the involute teeth of the gear. The working point of the dressing tool must always be normal to the surface to be produced on the disk at the points of contact. Also, the tool must always lie in a radial plane passing through the axis of the grinding disk, but such plane will shift to some extent through a radial angle so that one end of the involute path traced by the working point in profiling the disk will be slightly offset circumferentially from and lie in a different radial plane from the other terminal end of the path.

According to the present invention the working tool is so moved relative to the grinding disk that the surface thereof will be accurately profiled to grind the involute surfaces of helicoidal teeth along the line of bearing contact when such gear operates with another gear.

A machine is provided which, after initial adjustment to conform to the pitch of the helicoidal teeth, operates automatically to cause the dressing tool to trace its proper path on the grinding disk. No intermediate adjustments are required between the beginning and finishing of the dressing operation, nor does the operation necessarily depend upon the skill of the operator. The operation can be carried through quite rapidly and absolute accuracy in dressing is assured.

In the drawings is illustrated a practical embodiment of the invention wherein mechanical means are provided to insure proper movement of the dressing tool under all conditions of operation.

In such drawings:

Fig. 1 is a top plan view;

Fig. 2 is a vertical section taken on the line 2—2 of Fig. 1;

Fig. 3 is a view in front elevation, and almost at right angles to Fig. 2;

Fig. 4 is a top plan view representing a modification of one of the parts shown in Figs. 1 through 3;

Figs. 5 and 7 are corresponding top and side views, more or less diagrammatic, showing the position of the essential working parts at the beginning of the dressing operation;

Figs. 8 and 9 are corresponding top and side views more or less diagrammatic, representing the position of the parts as shown in Figs. 5 and 7 at the end of the dressing operation; and Fig. 6 is a perspective view of a fragmentary portion of a finished grinding disk indicating on the profiled surface thereof the path traced by the grinding tool.

It is preferred to use a dressing or truing device which is suitable for direct employment in a helical gear grinding machine, without the necessity of changing the position of the grinding disk. The embodiment illustrated involves such an arrangement, and while the same makes for greater accuracy it is not to be understood that the invention is limited to such an installation.

The dressing device is set up between center points 12 and 13 on a longitudinally slidable base member 54, such points normally holding the gear to be ground. The main supporting part of the device 11 is hung at its ends on the center points so that it may be swung about the axis of such points. Adjustably supported in the member 11 is a shaft 14, capable of being rotated therein and adjusted vertically as a preliminary matter, and adapted to be rigidly clamped in adjusted position through bolts 51. The axis of shaft 14 intersects the line which would be occupied by the axis of the pitch circle of the gear to be ground, and it will be noted in this connection that the axis of the shaft lies in a plane passing through the axis between the center points 12 and 13.

Fixed to the upper end of shaft 14 and adjustable therewith is a channeled guide member 15. A working tool frame 17 is carried by guide member 15, and the same is provided with supporting points 18 providing for relative sliding movement between members 15 and 17. Such arrangement is best seen in Fig. 2 wherein it will be observed that the frame 17 is so constructed as to be accurately guided on member 15 without any disturbance by the grinding dust. Pivotally supported spring held arms are carried on the underside of frame 17 provided with rollers 22 which engage under a flange on guide member 15.

Instead of utilizing contact points 18, as in Figs. 1 and 2, the frame member 17 may be constructed as shown in Fig. 4 with roller supports 30.

Frame member 17 carries a tool holder 26 in the end of which is inserted the dressing tool 16 which preferably will comprise a diamond point. The tool holder 26 is so supported in frame 17 that through rotative adjustment of guide member 15 on its supporting shaft 14 the tool holder can be held in a vertical radial plane passing through the axis of the grinding disk 10.

A pair of upright opposing channeled guide bars 24 are provided which at their lower ends pivotally connect with the tool holder 26 through transverse pins 23, as best shown in Figs. 1 and 2. A connecting bolt 29 is provided to hold the guide bars in properly spaced relation. The The guide bars must be vertically movable to allow for tilting of the working tool, and must also be capable of tilting slightly so that the working tool may always operate in a radial plane passing through the axis of the grinding disk. For this purpose a carrier 25 is provided having a pair of rollers 27 riding in the interior channels of the guide bars, as shown in Fig. 1, and a second pair of spring loaded rollers 28 engaging the outer sides of guide bars 24. The rollers 27 and 28 are so proportioned and arranged that while accurately supporting guide bars 24 for vertical movement they will permit the guide bars to tilt slightly relative to member 25. Member 25 is fixed to a supporting link 42 hereafter to be described.

For fixing the position of guide member 15 and of the dressing tool 16 to correspond to the line of simultaneous engagement between coacting helical teeth, member 15 is adjusted on its shaft 14, and the same may be properly positioned at pitch circle distance and the required angle through the use of a caliper piece 19 employed between pin 20 on the supporting member 11 and pin 21 on guide member 15.

To produce accurate profiling of the disk corresponding to the helical direction of the gear teeth, the supporting member 11 which carries guide member 15 is caused to undergo a screw motion by simultaneously shifting member 11 in an axial direction under longitudinal movement of the main supporting base 54 and rotating the same on the center points 12 and 13.

For the latter purpose a bar 33 is supported for sliding movement transversely of base member 54 carrying a pin 34 engageable with a fixed grooved member 35 so inclined that the groove coacting with pin 34 represents the pitch of the teeth. Connecting with bar 33 is a pair of steel springs 36 wrapped around and fixed at their ends to a rotatable drum 37. Rotatable with the drum is an arm 38 connected through a bolt or pin 53 to arm 52 of the supporting member 11. Through such arrangement longitudinal movement of the supporting base 54 causes bar 33 to move transversely. The latter movement through the spring bands produces rotation of the drum and tilting movement of the supporting member 11. Through the simultaneous axial and tilting movements of the supporting member 11, guide member 15 is carried through a screw path corresponding to the helical direction of the teeth of the gear to be ground.

The screw motion of guide member 15 produces a tilting of the tool carrying frame 17. Since, however, frame member 17 is slidable relative to guide member 15, and by reason of the connection between the tool holder 26 carried by frame member 17 and the vertical guide bars 24, frame member 17 slides longitudinally of guide member 15 under screw movement of the latter. This may be best understood by reference to Figs. 5 and 8. As the supporting member 11 is moved axially in the direction indicated by arrow A, and is simultaneously turned, guide member 15 slides along frame member 17, frame member 17 being more or less supported by guide bars 24. It will be observed that since guide member 15 extends at an inclination to the axis of supporting member 11, there is a lateral component of movement of frame member 17 because of its sliding relation to guide member 15 as well as a tilting component. The guide bars 24 move downwardly and at the same time tilt slightly from the vertical in their supporting carrier 25.

In utilizing the apparatus described the guide member is adjusted, if necessary, with the aid of a suitable caliper piece 19, through turning of its supporting shaft 14 to the correct angle relative to the tilting axis of the supporting member 11 through points 12 and 13 (corresponding to the axis of the pitch cylinder of the gear to be ground). This gives the angle corresponding to the inclination of the helicoidal gear teeth.

The guide rods 24 should be aligned with the plane of the tool holder 26. Since such rods are carried by an arm on the turret of the machine (Fig. 2) rotation of the turret will effect any necessary adjustment for this purpose. By reason of the alignment of the carrier 25 with rollers 27 and 28 along the axis of the disk such adjustment, with the angular adjustment of the guide member 15, positions the working tool in a radial plane passing through the axis of the disk so that the grinding point of the tool is held normal to the grinding surface of the disk.

The shaft 14 is also adjusted vertically, if necessary, through use of a suitable caliber piece 32 (Fig. 2) until the guide member 15 supports the working point 16 at pitch circle distance from the axis through points 12 and 13.

The dressing operation is then carried out by moving the machine member 54 longitudinally along underlying guide rails of the machine bed while the grinding disk is rotated at a moderate speed. As the supporting member 11 and guide member 15 move helically as a result of such longitudinal movement and the simultaneous rotating movement produced through parts 33—38, 53 and 52, the tool point 16 moves through a path on the grinding surface of the disk as indicated in Fig. 6. The tool holder inclines and the tool point moves upwardly under the tilting of guide member 15. During such movement the tool point is maintained in a radial plane passing through the axis of the disk through its support from guide bars 24 and through relative sliding of the tool frame member 17 over the guide member 15. Since the movement of guide member 15 with supporting member 11 and machine member 54 is longitudinal of the tilting axis of supporting member 11, whereas guide member 15 extends at the angle of the teeth to such axis, the frame member 17, as the guide member slides thereunder, and the working point 16 are moved inwardly towards the disk at the same time they are tilted. Also because of such combined movements the point shifts slightly circumferentially of the disk as it moves upwardly. At all times, however, the tool point is maintained normal to the disk at the point of contact and in a radial plane passing through the axis of the disk because of its pivotal connection with guide bars 24 which can tilt slightly in their carrier 25 positioned at the axis of the disk.

The result of these conditions is that the tool point 16 is guided in an ideal straight line relative to the pitch circle cylinder in the direction of lines of simultaneous engagement between cooperating teeth. At the same time the tool point is held in a plane (which gradually shifts to a slight degree) radial to the axis of the grinding disk so that it is constantly on a tangent to the pitch circle cylinder and stands normal to the surface of the disk at the point of dressing contact. The tool point will therefore follow an involute path in profiling the disk, but for reasons above explained such path of movement does not lie in a single radial plane perpendicular to the face of the disk, nor will such path conform to the actual involute profile of the teeth. The inner finishing end of the path will be in advance in a circumferential direction to a slight extent of the outer beginning end of the path. Such path taken by the tool point in moving across the working surface of the grinding disk coincides with the grinding line of the disk which constitutes the line of contact between the working surface of the disk and the surface of the gear tooth to be ground. It will be understood that in following the grinding line across the profile of the grinding disk the tool point at the same time is always maintained, as above stated, on a line along which the point of bearing contact at the surface of the gear tooth to be ground moves when such tooth meshes with another gear tooth.

The path of movement of the dressing point, as above described, is intended to produce the main profile on the grinding disk for operating on the involute faces of the gear teeth down to the pitch circle cylinder. To accurately grind areas of the teeth within the cylinder the tool is temporarily shifted a short distance out of a radial plane lying on the axis of the grinding disk so that the carrier 25, which supports guide bars 24, no longer coincides with the axis of the grinding disk. For this purpose member 42, which supports the carrier 25, is swingably mounted on a bolt 40 in the arm of the machine frame. A hand lever 41 is provided to turn member 42 and locking means 39 are employed to secure the bolt in the end positions of the arcuate path of member 42. One of such end positions gives the proper setting of guide bars 24 and tool point 16 for accurate truing of the main profile surface of the grinding disk.

After the dressing of the grinding disk has been completed, the supporting member 11 and associated parts can be removed from the machine and a gear to be ground fitted between center points 12 and 13, and the grinding disk is ready to grind the same without further adjustment.

The present invention involves a new continuous and rapid accurate method of truing grinding disks for use with helicoidal involute gear teeth. The basic features of such method and essential features of a machine for the purpose are not to be taken as limited in practice to the detailed construction of the embodiment here described and illustrated. It will be understood, furthermore, that instead of providing the truing apparatus as an attachment for gear grinding machines it may be embodied as a separate dressing machine.

I claim:

1. The method of dressing grinding disks for grinding gears having helicoidal teeth with an involute profile, comprising setting a grinding disk at the helical angle of the teeth of the gear to be ground with respect to a designated axis, holding a grinding tool to extend tangentially of the pitch circle cylinder of the gear to be ground centering on said designated axis and at an angle to said designated axis, said tool being held in a radial plane passing through the axis of the grinding disk, and gradually tilting the tool about the designated axis and moving the tool point along a path across the working surface of the disk, and constantly maintaining the tool tangent to the pitch circle cylinder and normal to the surface of the disk at the working point during movement along the path.

2. The method of dressing a grinding disk for grinding helicoidal gears having teeth with an involute profile, comprising guiding a dressing tool along a path in the straight line direction of the line of engagement between the coacting helical teeth of gears of the form of the gear to be ground and at the same time constantly holding the dressing point of the tool so as to lie in a common radial plane with the axis of the grinding disk and normal to the said line of coacting teeth engagement, and thereby moving the dressing point of the tool along a curved path across the grinding surface of the disk along a line representing the line of contact of the disk with the involute side of the tooth of the gear to be ground when such gear is screwed past the profiled disk surface.

3. A device for dressing grinding disks for grinding helicoidal gears having teeth with an involute profile, comprising a supporting member adapted to rotate about an axis and simultaneously move in the direction of its axis of rotation, means for guiding said supporting member in a rotary screw line past the grinding disk to be dressed, a dressing tool rotatable with said supporting member about said axis but capable of relative movement with respect to the supporting member, and means for holding the dressing tool during rotation in a radial plane passing through the axis of the disk to be ground under screw movement of the supporting member.

4. A device for dressing grinding disks for grinding helicoidal gears having teeth with an involute profile, comprising a supporting member adapted simultaneously to rotate about an axis representing the axis of the gear to be ground and to move lengthwise of such axis, means for causing said supporting member to screw along said axis at an angle to the axis of the grinding disk corresponding to the helical angle of the teeth of the gear to be ground, a slide member carried by the supporting member, said slide member being rotatable with the supporting member but under axial movement of the supporting member being adapted to slide relative thereto on a line at the helical gear angle to the supporting member axis, a dressing tool mounted in said slide member to rotate therewith, and means for maintaining the tool with its axis in a common radial plane with the axis of the grinding disk during rotation of the slide member with the supporting member.

5. A device for dressing grinding disks for grinding helicoidal gears having teeth with an involute profile, comprising a supporting member adapted simultaneously to rotate about an axis representing the axis of the gear to be ground and to move lengthwise of such axis, means for causing said supporting member to screw along said axis at an angle to the axis of the grinding disk corresponding to the helical angle of the teeth of the gear to be ground, a slide member carried by the supporting member, said slide member being rotatable with the supporting member but under axial movement of the supporting member being adapted to slide relative thereto on a line at the helical gear angle to supporting member axis, a dressing tool mounted in said slide member to rotate therewith, and a guide arm supported radially of the grinding disk for holding the tool in operative position relative to the disk, said guide arm being adapted to move lengthwise and to swing about the axis of the disk during rotative movement of the slide member.

6. A device for dressing grinding disks for grinding helicoidal gears having teeth with an involute profile, comprising a supporting member adapted simultaneously to rotate about an axis representing the axis of the gear to be ground and to move lengthwise of such axis, means for causing said supporting member to screw along said axis at an angle to the axis of the grinding disk corresponding to the helical angle of the teeth of the gear to be ground, a guide member, a slide member carried by the guide member, a tool mounted in the slide member, the guide member being carried by the supporting member to screw therewith, said guide member being adjustable on the supporting member to change the angle of the slide member relative to the axis of the supporting member, the slide member being relatively slidable in a straight line path along the guide member during screw movement of the latter, and means for holding the tool in operative position relative to the grinding disk during rotation of the slide member with, and sliding movement relative to, the guide member under screw movement of the supporting member.

7. A device for dressing grinding disks for grinding helicoidal gears having teeth with an involute profile, comprising a supporting member adapted to rotate about an axis and simultaneously move in the direction of its axis of rotation, means for guiding said supporting member in a rotary screw line past the grinding disk to be dressed, a dressing tool rotatable with said supporting member about said axis but capable of relative movement with respect to the supporting member, means for holding the dressing tool during rotation in a radial plane passing through the axis of the disk to be ground under screw movement of the supporting member, and adjusting means for shifting the dressing tool to an operative position relative to the disk so that the tool axis lies in a plane slightly inclined to the axis of the disk.

8. The method of dressing the involute grinding surface of a grinding disk for use in grinding involute helicoidal gear teeth which comprises setting the grinding disk with its axis at the helical angle of the teeth of the gear to be ground with respect to a designated axis representing the gear axis and rotating the disk, positioning a dressing tool with its dressing point against the grinding surface of the disk at one side edge of such surface with the tool axis normal to the surface at the point of contact of the dressing point and lying in a common plane with the disk axis, moving the dressing point of the tool across the grinding surface to the opposite side edge by gradually tilting the tool about the said designated axis, and, simultaneously with said tilting movement, moving the dressing point a short distance circumferentially of the grinding surface by shifting the tool lengthwise of the said designated axis while always maintaining the tool axis normal to the grinding surface at the point of contact of the dressing point and planar with the disk axis.

HANS MOLLY.